United States Patent [19]

von Rutte et al.

[11] E Re. 30,227

[45] Reissued Mar. 11, 1980

[54] AGENT FOR BRIGHTENING AND REMOVING GREYNESS FROM TEXTILES

[75] Inventors: Richard von Rütte, Riehen; Walter Gasser, Basel, both of Switzerland

[73] Assignee: Ciba-Geigy Corporation, Ardsley, N.Y.

[21] Appl. No.: 894,262

[22] Filed: Apr. 7, 1978

Related U.S. Patent Documents

Reissue of:

[64] Patent No.: 4,008,172
Issued: Feb. 15, 1977
Appl. No.: 519,890
Filed: Oct. 31, 1974

[30] Foreign Application Priority Data

Nov. 29, 1973 [CH] Switzerland ..... 16761/73

[51] Int. Cl.[2] ..... C09K 11/00; D06L 3/12

[52] U.S. Cl. ..... 252/301.22; 252/301.27; 252/301.29

[58] Field of Search ..... 252/301.22, 301.27, 252/301.29, 301.21

[56] References Cited

U.S. PATENT DOCUMENTS

| | | | |
|---|---|---|---|
| 3,360,479 | 12/1967 | Hausermann | 252/301.23 |
| 3,429,825 | 2/1969 | Voedisch | 252/301.35 |
| 3,475,190 | 10/1969 | Fischer et al. | 252/301.23 X |
| 3,479,349 | 11/1969 | Allison et al. | 260/240 |
| 3,485,831 | 12/1969 | Dorlars et al. | 252/301.22 X |
| 3,684,728 | 8/1972 | Kissling et al. | 252/301.23 |
| 3,689,429 | 9/1972 | Deubel et al. | 252/301.23 |
| 3,767,587 | 10/1973 | Claussen et al. | 252/301.23 |
| 3,825,514 | 7/1974 | Drury et al. | 260/29.6 TA |
| 3,867,376 | 2/1975 | Guenter et al. | 542/461 |
| 3,900,608 | 8/1975 | Dierkes et al. | 427/158 |
| 3,905,964 | 9/1975 | Yoshikawa et al. | 252/301.23 X |

FOREIGN PATENT DOCUMENTS

| | | |
|---|---|---|
| 835719 | 5/1960 | United Kingdom . |
| 955896 | 4/1964 | United Kingdom . |
| 967891 | 8/1964 | United Kingdom . |
| 982196 | 2/1965 | United Kingdom . |
| 1049482 | 11/1966 | United Kingdom . |
| 1243990 | 8/1971 | United Kingdom . |

*Primary Examiner*—F. C. Edmundson
*Attorney, Agent, or Firm*—Prabodh I. Almaula

[57] ABSTRACT

Agent for the preparation of the baths for brightening the color of and removing the greyness from white and pastel colored textiles which are made from synthetic fibers or which are provided with an easy-care finish and are made from cotton or blends thereof with synthetic fibers, which consists essentially of an organic polymer which is soluble or emulsifiable in water and is a homopolymer of acrylic or methacrylic acid or an ester or amide thereof, a copolymer of acrylic or methacrylic acid or an ester of amide thereof with acrylic or methacrylic acid alkylpolyalkylene glycol ester, a polyvinyl acetate or a water-soluble starch derivative, and a mixture thereof, and a fluorescent brightener which is soluble or dispersible in water.

9 Claims, No Drawings

AGENT FOR BRIGHTENING AND REMOVING GREYNESS FROM TEXTILES

Matter enclosed in heavy brackets [ ] appears in the original patent but forms no part of this reissue specification; matter printed in italics indicates the additions made by reissue.

The present invention provides agents by means of which it is possible to substantially brighten textiles which have no or only a low degree of receptivity for regenerators in a conventional washing or rinsing process, and also a process for brightening and removing greyness from textiles.

It is common knowledge that white and also pastel coloured textiles made from synthetic fibres or cotton, and white and pastel coloured textiles made from cotton or blends thereof with synthetic fibres and provided with an easy care finish, have a marked proneness to greying and yellowing. In the present state of the art, this greying and yellowing cannot be corrected—or can only be corrected to a modest extend—by a normal washing process with a heavy duty detergent, since on the one hand textiles made from synthetic fibres, in particular those from polyester and polyamide, absorb particularly large amounts of dirt (despite the addition of antistatic agents) which cannot be removed quantitatively in the wash solution. On the other hand, the resin finish given to cellulosic textiles treated with synthetic resins normally prevents to a great extent the exhaustion of fluorescent brightener onto the fibres.

The agent according to the invention for brightening the colour of and removing the greyness from white and pastel coloured textiles which are made from synthetic fibres or which are provided with an easy care finish and are made from cotton or blends thereof with synthetic fibres, comprises an organic polymer which is soluble or emulsifiable in water and a fluorescent brightener which is soluble or dispersible in water.

These agents are aqueous solutions or suspensions which normally contain 5 to 50 percent by weight, in particular 10 to 40 percent by weight, of the polymer and 0.05 to 2, preferably 0.1 to 1 percent by weight of fluorescent brightener.

Suitable polymers are principally those from homopolymers of acrylic or methacrylic acid or esters or amides thereof, those from copolymers of acrylic or methacrylic acid and/or esters or amides thereof with acrylic or methacrylic acid polyethylene glycol ester, in particular acrylic acid polyethylene glycol ester or acrylic acid alkylpolyalkylene glycol ester, especially acrylic acid methylpolyethylene glycol ester of a molecular weight of 200 to 900, preferably 300 to 800, those from polyvinyl acetate or from water soluble starch derivatives. By water soluble starch derivatives are meant above all starch ethers, e.g. hydroxyethyl starch, and starch esters. In some cases, polyvinyl alcohol as well as water-soluble melamine-formaldehyde or urea-formaldehyde condensation products or butadiene-maleic acid condensation products are also very suitable for use. Naturally, it is also possible to use mixtures of two or more of the cited polymer substances.

Esters of acrylic or methacrylic acid with an interesting utility are principally the alkyl esters with 1 to 4 carbon atoms, and preferred amides of acrylic or methacrylic acid are the unsubstituted amide or the amide which is monosubstituted or disubstituted at the nitrogen atom by alkyl or hydroxyalkyl with 1 to 4 carbon atoms, for example the N-methylolamide.

Preferred polyamides are those which have been formed by copolymerization of acrylic acid methyl polyethylene glycol ester of the formula (1) $CH_2—CH_2—COO(CH_2CH_2O)_n—CH_3$, wherein n is an integer from 14 to 22, in particular 16 to 22 and preferably 17, with acrylic acid. A polymer of this kind is manufactured, for example, in the following manner:

40 Parts of acrylic acid methylpolyethylene glycol ester (molecular weight of the methylpolyethylene glycol = 750) and 5 parts of acrylic acid are dissolved in 167 parts of water. This solution is adjusted to pH 6.5 to 7.0 with 25% aqueous ammonia and treated with 5 parts of N-methylol acrylic acid amide. While stirring and passing in nitrogen, one third of this solution is treated at 60° C. with a solution of 0.17 part of potassium peroxy disulphate in 3 parts of water and a solution of 0.17 part of sodium metabisulphite in 3 parts of water. Upon onset of the polymerization, the remainder of the solution of the monomers is added to the polymerization vessel over the course of 45 minutes. Simultaneously but separately, a solution of 0.23 part of potassium peroxy disulphate in 7 parts of water and a solution of 0.23 part of sodium metabisulphite in 7 parts of water are added dropwise. Upon completion of the addition, an after-polymerization is carried out for 3 hours at 60° C. There are obtained about 238 parts of a solution with a pH of 6.5 and a solids content of about 21%, corresponding to a polymer yield of 98%.

The fluorescent brighteners which are particularly suitable for the process according to the invention belong to the classes of the distryrylbiphenyls, the bis-(s-triazinylamino)-stilbene-2,2'-disulphonic acids or of the bis-(triazolyl)-stilbenes and have a solubility at 20° C. of at least 0.5 g/l water.

Bis-(s-triazinylamino)-stilbene-2,2'-disulphonic acids of the formula

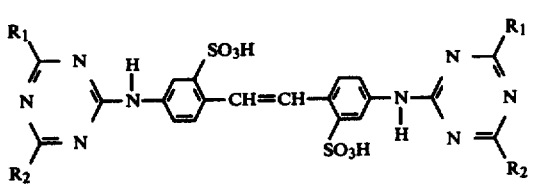

(2)

wherein each of $R_1$ and $R_2$ independently represents alkoxy with 1 to 4 carbon atoms, unsubstituted or by hydroxy or alkoxy with 1 to 4 carbon atoms substituted monoalkyl- or dialkylamino having 1 to 4 carbon atoms in the alkyl moieties or anilino which is unsubstituted or substituted by sulpho groups are of particular importance.

Fluorescent brighteners of the class of the bis-(triazole)-stilbenes of the formula

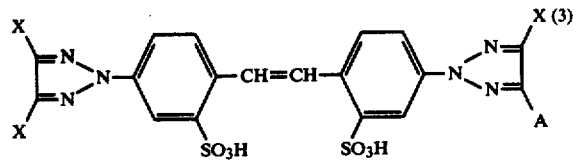

(3)

wherein X represents hydrogen or chlorine and A represents a phenyl radical which is unsubstituted or substituted by alkyl with 1 to 4 carbon atoms, halogen or sulpho groups are of particular interest.

However, distryrylbiphenyls, e.g. 4,4'-bis-(2-sulphostyryl)-diphenyl or other derivatives thereof are of especial interest. These compounds normally fall under the formula

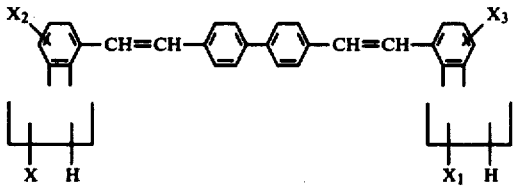

(4)

wherein X represents sulpho, $X_1$ represents hydrogen, chlorine, alkyl with 1 to 4 carbon atoms, alkoxy with 1 to 4 carbon atoms or sulpho, each of $X_2$ and $X_3$ independently represents hydrogen, chlorine, alkyl with 1 to 4 carbon atoms or alkoxy with 1 to 4 carbon atoms.

Within the scope of the formula (4) the preferred compounds are those of the formula

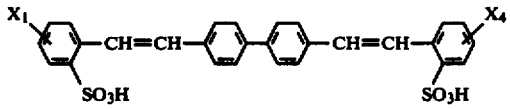

(5)

wherein $X_1$ represents hydrogen, chlorine, methyl or methoxy.

It will be readily understood that the formulae (1) to (5) comprise not only the free acids but also the salts, especially the alkali, alkaline earth, ammonium and amino salts as described e.g. in the German Auslegeschrift No. 1794139 and 1796306. The compounds of the formulae (1) to (5) are ordinarily used in the form of their potassium and preferably sodium salts.

It is of course also possible to use mixtures of two and more fluorescent brighteners.

For brightening the colour of and removing the greyness from white and pastel coloured textiles, these are treated with an aqueous liquor which contains an agent according to the invention.

The treatment is ordinarily carried out in a rinsing solution over the course of 1 to 10 minutes, preferably 2 to 5 minutes, at room temperature following the washing process. After the treatment, the brightened textile is normally centrifuged very briefly and then dried.

As has been mentioned hereinbefore, the textiles are normally brightened from rinsing solutions containing the polymer and the fluorescent brightener. The aqueous liquor can contain 0.02 to 5 percent by weight of polymer and 0.001 to 0.2 percent by weight of fluorescent brightener. As a rule, however, the amount of polymer is 0.05 to 2, preferably 0.2 to 1 percent by weight, and of fluorescent brightener is 0.005 to 0.1 percent by weight. The ratio of polymer to brightener is between 200:1 and 5:1, preferably between 50:1 and 10:1.

The composition of the agent according to the invention is not limited only to the defined polymer and the defined fluorescent brightener: these merely constitute the inventive feature. For example, the agent can contain up to 2 percent by weight, preferably 0.2 to 1 percent by weight, of dyes and/or perfumes, and, depending on the polymer content, up to 80 percent by weight, preferably up to 50 percent by weight, of fabric softener. It is possible to use, moreover, fabric softeners, dyes or perfumes of the most widely different kind. It is essential, however, that these additives are soluble or dispersable in the liquor.

The agent according to the invention may also contain monomers which have not been reacted during the polymerization as well as substances that originate from the reaction mixture for the manufacture of the polymer, e.g. catalyst.

A special utility of both the agent and the process according to the invention is for brightening cellulosic textiles which have been given an easy-care finish. The term "easy-care" is widely understood as meaning a treatment of cellulose fibres, especially of cotton, by means of which similar characteristics are imparted to these fibres as are possessed by synthetics, e.g. shrink resistance and crease recovery, without the cellulose fibres losing to a disproportionate degree any of the advantages they possess over synthetic fibres, e.g. their capacity to absorb water. In a treatment of this kind, the cellulosic textiles are normally finished at present with resins by means of the dry, moist or wet crosslinking process. Principally N-methylol compounds which are prepared by reaction of formaldehyde with suitable compounds containing NH or $NH_2$ groups are used as resins. Examples of such N-methylol compounds are: dimethylolethylene urea, dimethyloldihydroxyethylene urea, dimethylolpropylene urea, dimethylolhydroxypropylene urea. Dyes or—especially in the finishing of white goods—fluorescent brighteners are frequently added to the resin precondensates.

EXAMPLE 1

1 g of the sodium salt of 4,4'-bis-(2-sulphostyryl)-diphenyl is dissolved while stirring at 25° C. in 100 g of an aqueuos 30% polyvinyl acetate emulsion. Then 250 g of a previously brightened but yellowed polyester/cotton textile (67/33) which has been given an easy-care finish is treated at room temperature with an aqueous 2 liter liquor that contains 60 g of the emulsion mentioned above. After 3 minutes the textile is briefly centrifuged and dried. The resultant white effect is a marked improvement over that obtained from the comparison test with the same amount of fluorescent brightener but without addition of the polyvinyl acetate emulsion.

EXAMPLE 2

1 g of the sodium salt of 4,4'-bis-[4-anilino-6-ethylamino-s-triazin-(2)-yl]-diaminostilbene-2,2'-disulphonic acid is dispersed at 25° C. in 100 g of a 20% aqueous solution of a copolymer of acrylic acid and acrylic acid methylpolyethylene glycol ester. Then 150 g of an unbrightened polyacrylonitrile fabric are treated at room temperature with an aqueous 1.5 liter liquor containing 50 g of the above dispersion. After 3 to 5 minutes the textile is squeezed out and dried at 60° C. A good, neutral white effect is obtained which is removable in the next wash. Good effects are also obtained in the corresponding application with polyamide or polyester textiles and also with wool fabrics.

EXAMPLE 3

0.5 g of the sodium salt of 4,4'-bis-(2-sulphostyryl)-diphenyl is dissolved in 100 g of a mixture of 1 part of a 20% aqueous solution consisting of (a) 10 g of a water-soluble starch and (b) 10 g of a copolymer of acrylic acid and acrylic acid methylpolyethylene glycol ester. Then 200 g of an unbrightened polyester textile are treated at room temperature for 10 minutes in an aqueous 2 liter liquor that contains 50 g of the above solution. An excellent white effect is obtained.

EXAMPLE 4

0.5 g of the sodium salt of 4,4'-bis-(2-sulphostyryl)-diphenyl is dissolved in 100 g of a mixture of 1 part of a 20% aqueous solution of polyvinyl alcohol and 1 part of an aqueous 30% dispersion of polyvinyl acetate.

Then 200 g of unbrightened polyamide 6,6-textile are treated at room temperature for 10 minutes in an aqueous 2 liter liquor containing 50 g of the above mixture. A strong white effect is obtained.

What we claim is:

1. Agent for the preparation of the baths for brightening the colour of and removing the greyness from white and pastel coloured textiles which are made from synthetic fibres or which are provided with an easy-care finish and are made from cotton or blends thereof with synthetic fibres, which consists essentially of an organic polymer which is soluble or emulsifiable in water and is a homopolymer of acrylic or methacrylic acid or an ester or amide thereof, a copolymer of acrylic or methacrylic acid or an ester or amide thereof with acrylic or methacrylic acid alkylpolyalkylene glycol ester, [a polyvinyl alcohol or a polyvinyl acetate, and a mixture thereof] *a mixture of polyvinyl alcohol and polyvinyl acetate* and a fluorescent brightener which is of the class of the distryrylbiphenyls, [the bis-(s-triazinylamino)-stilbene-2,2'-disulphonic acids] or of the bis-(triazolyl)-stilbenes, which at 25° C. has a solubility of at least 0.5 g/l water.

2. Agent according to claim 1, which consists essentially of 5 to 50 percent by weight of polymer and 0.05 to 2 percent by weight of fluorescent brightener.

3. Agent according to claim 1 wherein the fluorescent brightener is 4,4'-bis-(2-sulphostyryl)-diphenyl or a derivative thereof.

4. Agent according to claim 3 wherein the polymer is one consisting of [polyvinylalchol or mixtures thereof with polyvinyl acetate] *a mixture of polyvinyl alcohol and polyvinyl acetate.*

5. Agent according to claim 1 wherein the polymer is a co-polymer of acrylic acid methylpolyethyleneglycol ester with a molecular weight of 200 to 900 and acrylic acid.

6. An aqueous bath for brightening the colour of and removing the greyness from white and pastel coloured textiles which are made from synthetic fibres or which are provided with an easy-care finish and are made from cotton or blends thereof with synthetic fibres, which consists essentially of 1. water
2. a water-soluble or water-emulsifiable polymer which is a homopolymer of acrylic or methacrylic acid or an ester or amide thereof with acrylic or methacrylic acid alkylpolyalkylene glycol ester, [a polyvinyl alcohol or a polyvinyl acetate] *a mixture of polyvinyl alcohol and polyvinyl acetate* in an amount corresponding to 0.02 to 5% by weight of the aqueous bath; and
3. a fluorescent brightener of the class of distyryl-biphenyls, [bis-(s-triazinylamino)-stilbene-2,2'-disulphonic acids] or bis-(triazolyl)-stilbenes, said brightener having a water solubility of 0.5 g/l at 25° C., said fluorescent brightener being present in an amount corresponding to 0.001 to 0.2% by weight of the aqueous bath.

7. An aqueous bath according to claim 6 which consists essentially of 1. said water
2. said water-soluble or water-emulsifiable polymer
3. said fluorescent brightener and also optionally contains
4. up to 2% by weight of a water-soluble or water-dispersible dye
5. up to 2% by weight of a water-soluble or water dispersible perfume, and
6. up to 80% by weight of fabric softener.

8. An aqueous bath according to claim 7, containing up to 50% by weight of fabric softener.

9. An aqueous bath according to claim 8 containing 0.05 to 2 percent by weight of said polymer and 0.005 to 0.1% by weight of said fluorescent brightener.

[10. Agent for the preparation of the baths for brightening the colour of and removing the greyness from white and pastel coloured textiles which are made from synthetic fibres or which are provided with an easy-care finish and are made from cotton or blends thereof with synthetic fibres, which consists essentially of an organic polymer which is soluble or emulsifiable in water and is a mixture of (a) a water-soluble starch and (b) a copolymer of acrylic acid and acrylic acid methylpolyethylene glycol ester, and a fluorescent brightener which is soluble or dispersible in water.]

* * * * *